(12) United States Patent
Aid et al.

(10) Patent No.: US 8,013,759 B1
(45) Date of Patent: Sep. 6, 2011

(54) TOWING MONITOR SYSTEM

(76) Inventors: James D. Aid, Largo, FL (US); Norman F. Cameron, St. Petersburg, FL (US); Shahid Q. Din, Palm Harbor, FL (US)

( * ) Notice: Subject to any disclaimer, the term of this patent is extended or adjusted under 35 U.S.C. 154(b) by 347 days.

(21) Appl. No.: 12/082,582

(22) Filed: Apr. 11, 2008

Related U.S. Application Data

(60) Provisional application No. 60/923,053, filed on Apr. 12, 2007.

(51) Int. Cl.
*G08G 1/00* (2006.01)

(52) U.S. Cl. ............... 340/904; 340/425.5; 340/426.1; 340/431; 340/442; 340/443; 340/444; 340/471; 340/459; 340/479; 303/123; 303/167; 701/70; 701/71

(58) Field of Classification Search ............ 340/904, 340/425.5, 426.1, 431, 442, 443, 444, 471, 340/159, 479; 303/123, 167; 701/70, 71
See application file for complete search history.

(56) References Cited

U.S. PATENT DOCUMENTS

| | | | | |
|---|---|---|---|---|
| 6,845,851 B1 * | 1/2005 | Donaldson et al. | ............ | 188/3 H |
| 2006/0076827 A1 * | 4/2006 | Albright et al. | ............... | 303/123 |
| 2008/0257656 A1 * | 10/2008 | Skinner et al. | ............ | 188/1.11 E |

* cited by examiner

*Primary Examiner* — Tai T Nguyen

(57) ABSTRACT

A transmitter unit has a housing adapted to be coupled in association with a trailing vehicle. The housing also has a multiple axis accelerometer adapted to sense the status of the transmitter unit and a trailing vehicle. The housing also has electronic components coupled with the accelerometer. A receiver unit has a housing adapted to be coupled in association with a leading vehicle. A user in audio proximity to the receiver unit is wirelessly signaled in the event of an anomaly at the transmitter unit.

20 Claims, 13 Drawing Sheets

TOWING MONITOR SYSTEM

RELATED APPLICATION

This application is based upon and claims the benefit of Non-Provisional application No. 60/923,053 filed Apr. 12, 2007, the subject matter of which is incorporated herein by reference.

BACKGROUND OF THE INVENTION

1. Field of the Invention

The present invention relates to a monitor system and more particularly pertains to wirelessly determining the status of a trailing vehicle from a leading vehicle and from other locations in a safe, reliable, convenient and economical manner.

2. Description of the Prior Art

The concept of this device is to monitor the motion of objects. These objects might typically, but not exclusively, be pulled behind a tow vehicle.

The device monitors the object's motion by the use of a single or multi-axis sensor. The signals generated by the sensor are then processed through algorithms, real time or otherwise, to detect specific malfunctions, parameters or deviations from normal operation. These algorithms may be in the form of, but not limited to, analog or digital filters. These algorithms can be customized for specific monitoring applications.

Such a device can be used in a typical towing application, to sense the motion occurring on a the trailed vehicle. This information, whether processed or unprocessed, can then be transmitted by wire or wireless communication to the receiver, typically mounted in the towing vehicle.

Motion deviations greater than those established by the operator, through any means of input to establish a threshold, including, but not limited to, a potentiometer, for example, defined automatically by the device software or a combination of both, as "normal" in the trailed vehicle can be detected. When these conditions are detected, then the user can be notified through any form of audio/visual notification alarms activated in the towing vehicle.

When installing the sensing unit in the trailed vehicle, any mounting angle deviation from level would typically create an error, reduction in signal or both. However, the sensing unit performs and goes through an automatic orientation process/algorithm. The system identifies the orientation and position data that the sensing device is mounted at, and uses a mathematical process and algorithm to adjust for this deviation from level in all axes. In addition, the mathematical process and algorithm re-scales the signal levels to compensate for the change in sensing unit orientation from level or other known orientation. The processing of such data can be processed, stored or a combination of both and can occur in the transmitting or receiving unit. Therefore, the motion detecting system does not have to be mounted to the trailed vehicle in any specific orientation.

The sensitivity threshold of the notification alarm can be fixed, manually adjusted or automatically adjusted to accommodate for variations in road surfaces and/or for variability, caused by changes in weight, suspension components, etc., from one trailed vehicle to another, thus preventing nuisance alarms.

Trailed vehicle failures that could be detected include, but are not limited to: delaminating or flat tire; wobbling tire, due to broken wheel, wheel bearing failure or loose lug nuts; disconnected hitch or wrong size/loose ball, detected by high fore/aft G's; axle failure, spring or shock absorber breakage, trailer frame failure as well as shifting loads in the trailer. The sensing unit can also incorporate a variety of sensors, including, but not limited to temperature, sound, light, pressure and vibration, and transmit the data to the receiving unit to be processed.

In addition to the previous detection capabilities, at specific settings, the system can also monitor for intrusion into the trailed vehicle. Additionally, the receiver can be set to alarm if the trailed vehicle is moved out of the normal signal transmission range, stolen or runaway vehicle.

The system can inform the user through a variety of means, but not limited to, including outputting the device alarm signal to a cell phone, a call could be placed to another phone if an intrusion or theft was in progress. Another feature might be the generation of an audio/visual alarm at the receiver or a phone notification message that is caused by temperatures at the transmitter that are above or below a specific alarm threshold.

In addition, based on the input signals from the sensing device in the trailed vehicle, the side to side angle and front to back angle, or a combination thereof, of the trailed vehicle can be monitored. An alarm point can be established, either fixed or adjustable, for angle deviation from what has been established as normal during the startup/initial calibration process or from a fixed reference in the operational code.

Additionally, angle detection can be performed in both the trailed vehicle and the tow vehicle. With angle detection sensed in both vehicles, either fixed or adjustable alarms can then be configured to detect a change in angle of the trailed vehicle in relation to the towing vehicle and vice versa.

In a similar application with motion detection functioning in both vehicles, a control program can be constructed to null out a motion pattern that occurs in both vehicles and monitor only the additional motion that is occurring in the target vehicle.

Using this method, nuisance vibration alarms that are totally associated with variations in the road surface and not associated to a failure on the target vehicle, could be eliminated.

The use of towing systems of known designs and configurations is known in the prior art. More specifically, towing systems of known designs and configurations previously devised and utilized for the purpose of monitoring towed vehicles through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,959,365 issued Sep. 28, 1999 to Mantini relates to a Early Warning Device for Tire Rims and Hub Assemblies and U.S. Pat. No. 4,033,607 issued Jul. 5, 1977 to Cameron relates to Means for Attenuating the Jarring and Vibration of a Truck-Tractor.

While these devices fulfill their respective, particular objectives and requirements, the aforementioned patents do not describe a towing monitor system that allows for wirelessly determining the status of a trailing vehicle from a leading vehicle and from other locations in a safe, reliable, convenient and economical manner.

In this respect, the towing monitor system according to the present invention substantially departs from the conventional concepts and designs of the prior art, and in doing so provides an apparatus primarily developed for the purpose of wirelessly determining the status of a trailing vehicle from a leading vehicle and from other locations in a safe, reliable, convenient and economical manner.

Therefore, it can be appreciated that there exists a continuing need for a new and improved towing monitor system which can be used for wirelessly determining the status of a trailing vehicle from a leading vehicle and from other locations in a safe, reliable, convenient and economical manner. In this regard, the present invention substantially fulfills this need.

SUMMARY OF THE INVENTION

In view of the foregoing disadvantages inherent in the known types of towing systems of known designs and configurations now present in the prior art, the present invention provides an improved towing monitor system. As such, the general purpose of the present invention, which will be described subsequently in greater detail, is to provide a new and improved towing monitor system and method which has all the advantages of the prior art and none of the disadvantages.

To attain this, the present invention essentially comprises a towing monitor system for wirelessly determining the status of a trailing vehicle, when in motion and when not in motion, from a leading vehicle and from other locations in a safe, reliable, convenient and economical manner. The system comprises, in combination, a manned self-powered leading vehicle chosen from the class of self-powered leading vehicles including automobiles, recreational vehicles, trucks and the like.

Next provided is an unmanned unpowered trailing vehicle chosen from the class of unpowered trailing vehicles including towed boats, automobiles, recreational vehicles, trucks, trailers and the like.

Provided next is a transmitter unit having a fixed or portable, removable, mounting housing adapted to be positioned in the trailing vehicle. The portable housing is in a configuration with a front face and a rear face, the rear face having a plurality of suction cups for removable mounting onto a surface of the trailing vehicle, the housing also having a plural axis accelerometer, three axis in the preferred embodiment, adapted to sense the status of the transmitter unit and the trailing vehicle. The housing also has electronic components coupled with the accelerometer. The electronic components includes 1) primary elements adapted to process sensed data using digital signal processing and to calculate and reorient position and acceleration vectors in free space before use, 2) a visual element adapted to visually indicate the status of the transmitter unit and 3) transmission elements adapted to transmit data regarding the status of the system. The transmitter unit also includes associated supplemental sensors including a low voltage sensor to determine a low voltage battery condition of the towed vehicle. A temperature detector functions to determine the presence of low or elevated temperature on the towed vehicle and an undesired condition status monitor to determine when an operational component in the towed vehicle is in a undesired condition. The operational component is selected from the class of operational components including door locks, TV antennas, windows, doors and kitchen appliances, and in response to such undesired condition to transmit both prior to and subsequent processing.

Lastly provided is a receiver unit having a housing adapted to be permanently or temporarily positioned in the leading vehicle as by a hook and loop fastener. The housing also has a receiver adapted to receive data transmitted from the transmission element. The housing also has 1) electronic detector components adapted to process the received data in real time for detecting anomalies, 2) electronic setting components adapted to adjust the sensitivity and threshold settings, 3) visual status indicators adapted to visually indicate the status of the system, 4) the transmission technique being chosen from the class of transmission techniques including single channel, special spectrum and frequency hopping with components adapted to enhance communications between the transmitter and receiver units and 5) an audio alarm adapted to signal a user in audio proximity to the receiver unit in the event of any anomaly at the transmitter unit, the transmitter unit having an antenna, the antenna unit being a component of a circuit board.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved towing monitor system which has all of the advantages of the prior art towing systems of known designs and configurations and none of the disadvantages.

It is another object of the present invention to provide a new and improved towing monitor system which may be easily and efficiently manufactured and marketed.

It is further object of the present invention to provide a new and improved towing monitor system which is of durable, portable and reliable constructions.

An even further object of the present invention is to provide a new and improved towing monitor system which is susceptible of a low cost of manufacture with regard to both materials and labor, and which accordingly is then susceptible of low prices of sale to the consuming public, thereby making such towing monitor system economically available to the buying public.

Even still another object of the present invention is to provide a towing monitor system for wirelessly determining the status of a trailing vehicle from a leading vehicle and from other locations in a safe, reliable, convenient and economical manner.

Lastly, it is an object of the present invention to provide a new and improved towing monitor system. A transmitter unit has a housing. The housing is adapted to be coupled in association with a trailing vehicle. The housing also has a multiple axis accelerometer. The accelerometer is adapted to sense the status of the transmitter unit and a trailing vehicle. The housing also has electronic components. The electronic components are coupled with the accelerometer. A receiver unit has a housing. The housing is adapted to be coupled in association with a leading vehicle. In this manner a user in audio proximity to the receiver unit is wirelessly signaled in the event of an anomaly at the transmitter unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
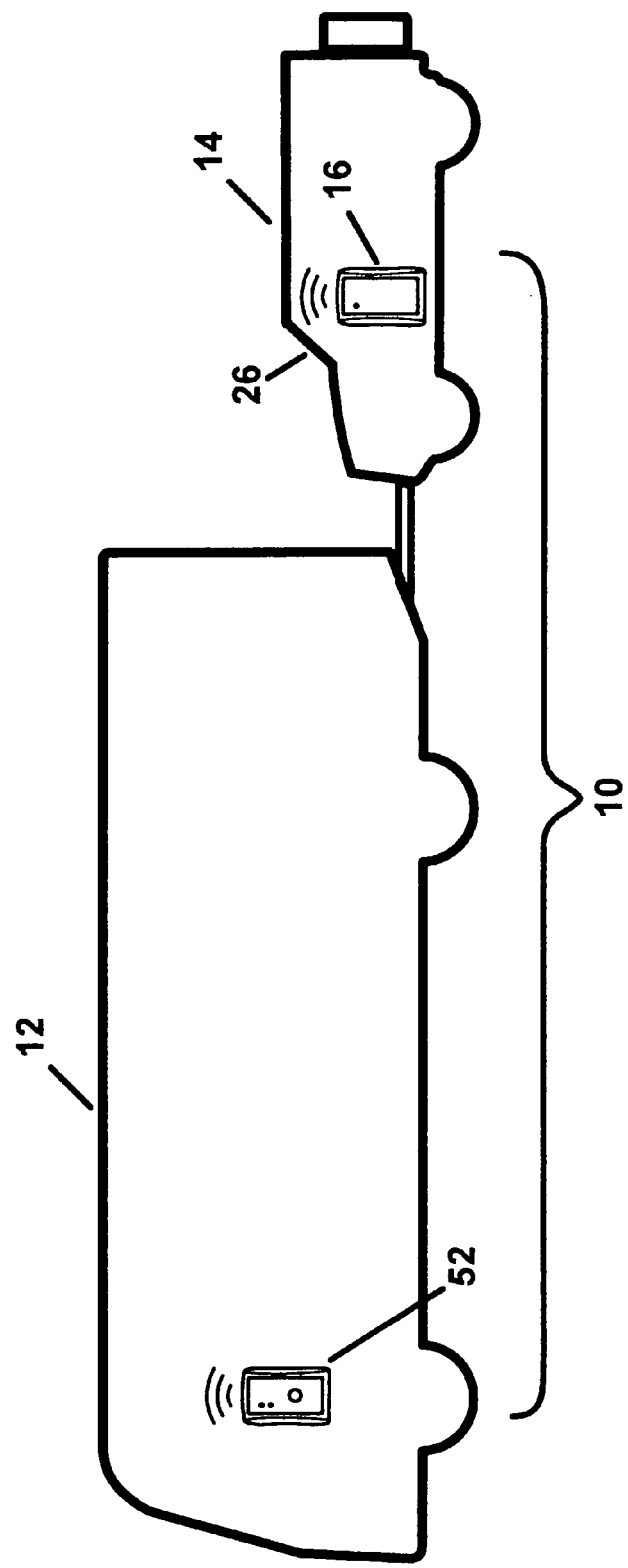
FIGS. 1, 2 and 3 are side elevational views of a towing monitor system constructed in accordance with the principles of the present invention.
Figure 2:
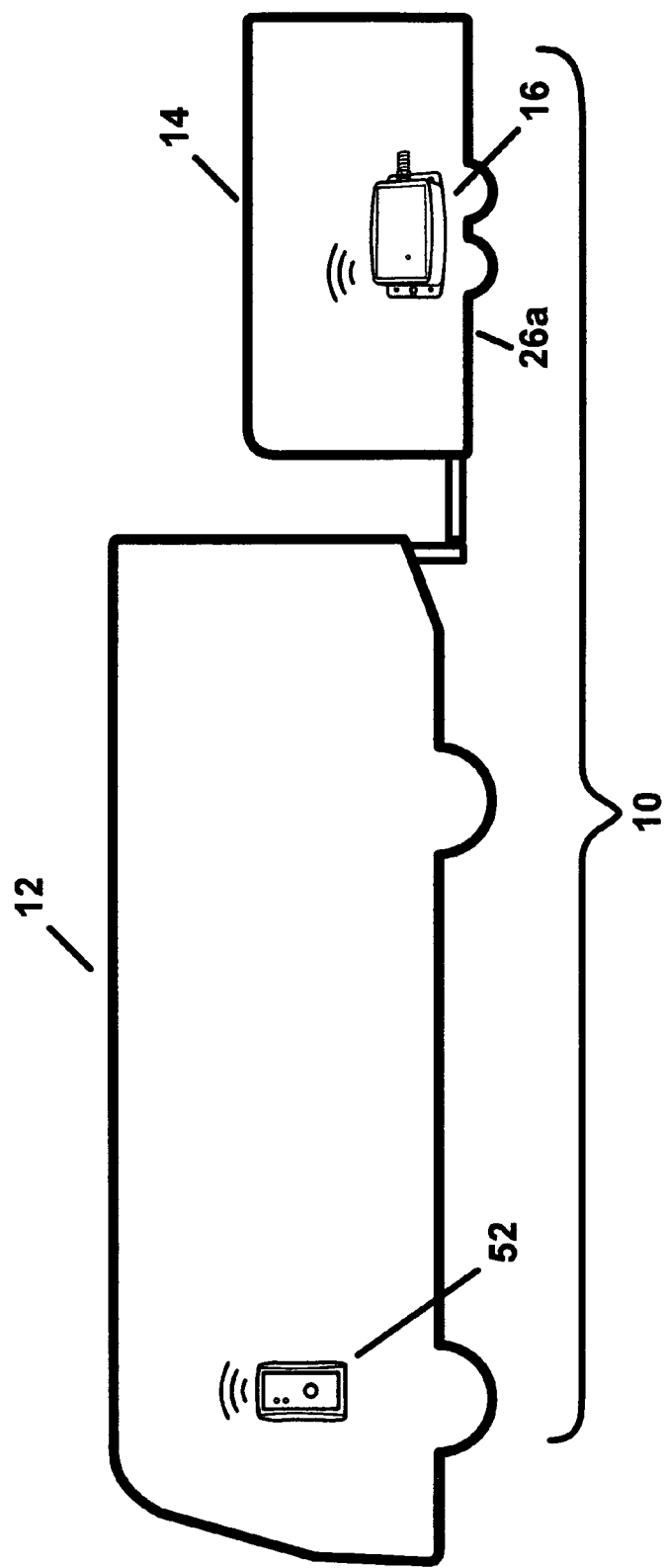
Figure 3:
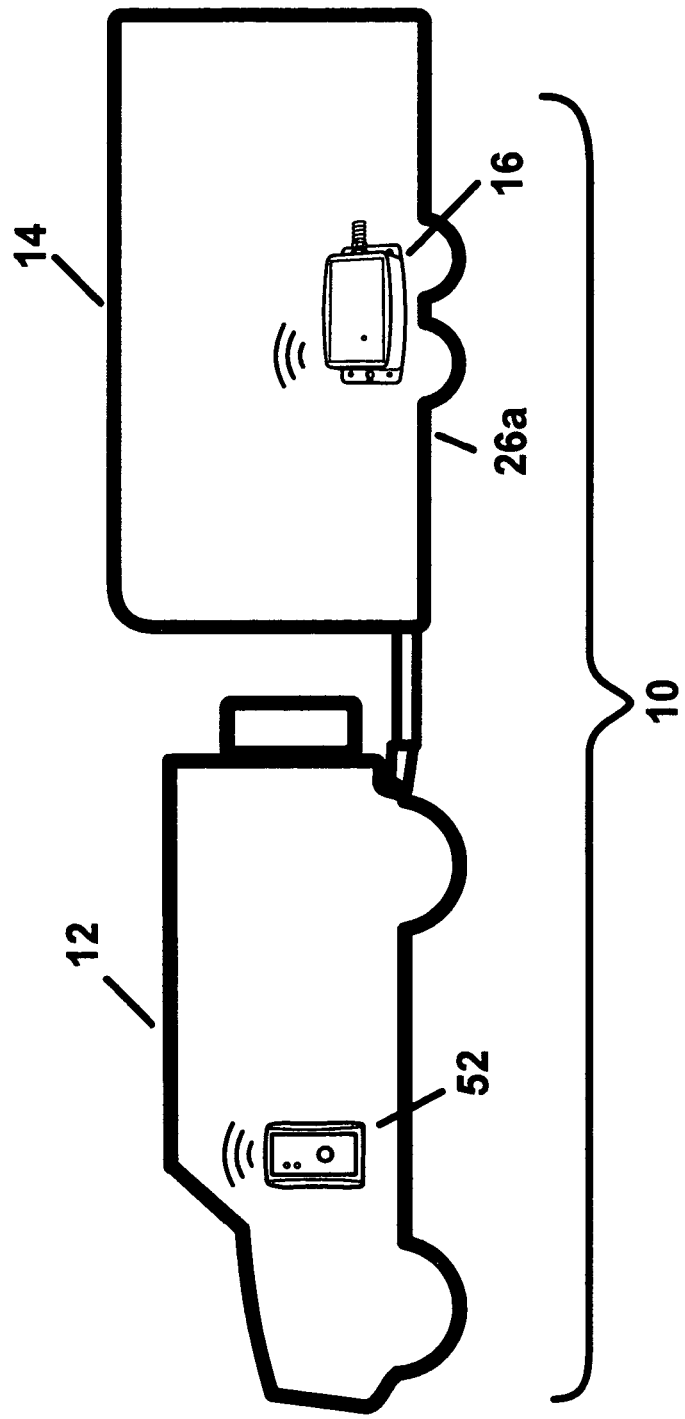
Figure 4:
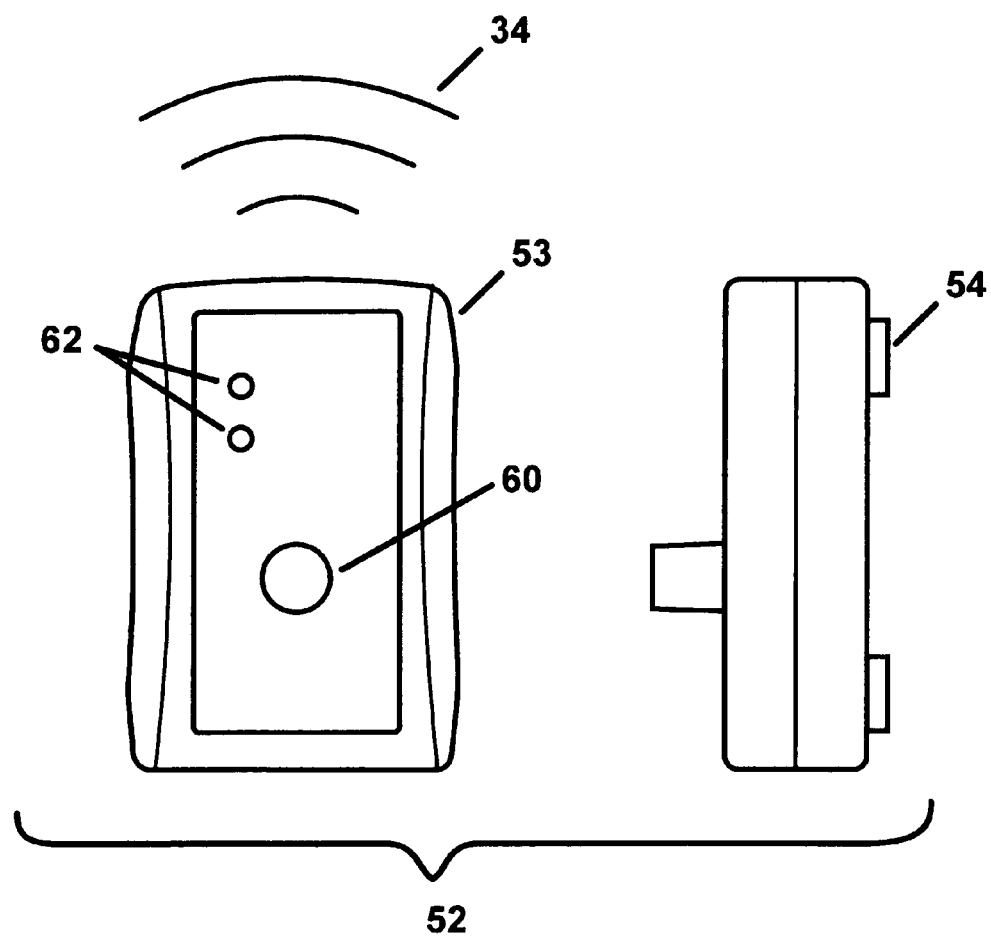
FIG. 4 is a front perspective illustration of a receiver unit shown in FIGS. 1,2 and 3.
Figure 5:
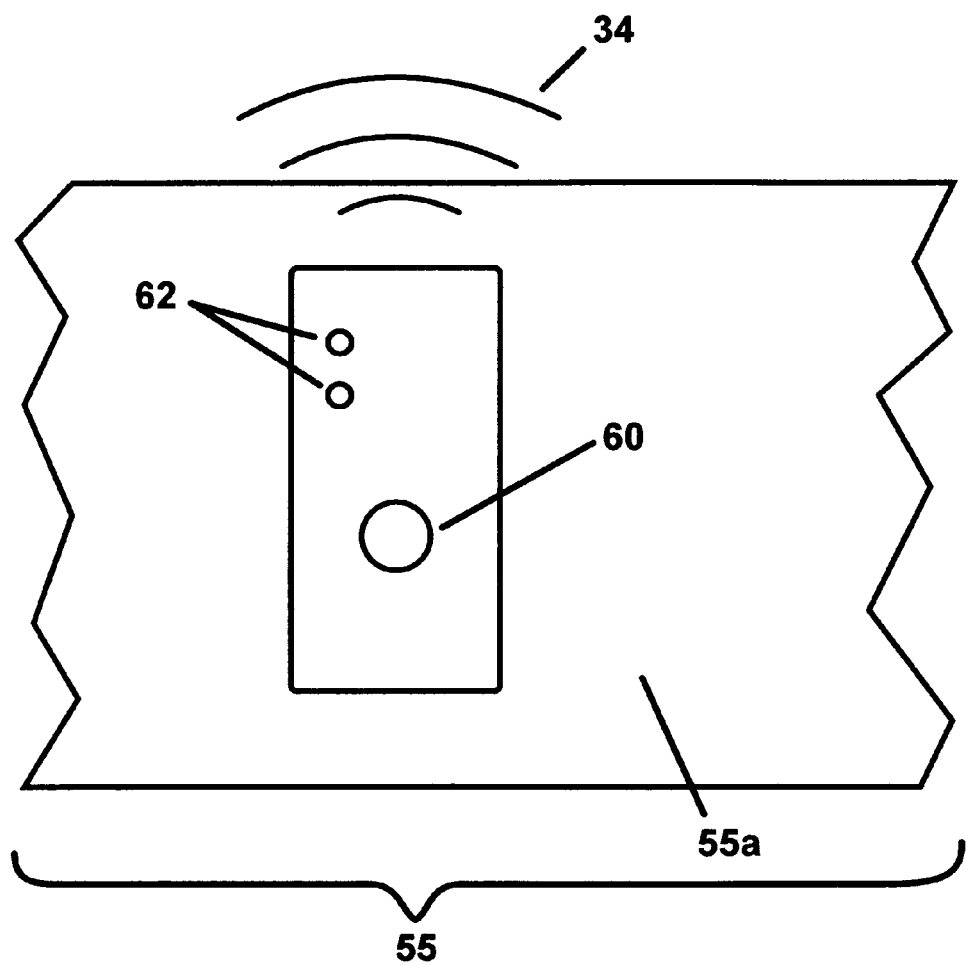
FIG. 5 is an alternate built-in receiver.

With reference now to the drawings, and in particular to FIG. 1 thereof, the preferred embodiment of the new and improved towing monitor system embodying the principles and concepts of the present invention and generally designated by the reference numeral 10 will be described.

The present invention, the towing monitor system 10 is comprised of a plurality of components. Such components in their broadest context include a transmitter unit and a receiver unit. Such components are individually configured and correlated with respect to each other so as to attain the desired objective.

First provided is a manned self-powered leading vehicle 12. The self-powered leading vehicle is chosen from the class of self-powered leading vehicles. The class of self-powered leading vehicles includes automobiles, recreational vehicles, trucks and the like.

An unmanned unpowered trailing vehicle 14 is provided. The unpowered trailing vehicle is chosen from the class of unpowered trailing vehicles. The class of unpowered trailing vehicles includes towed boats, automobiles, recreational vehicles, trucks, trailers and the like.

Provided next is a transmitter unit 16. The transmitter unit has a housing 18. The housing is adapted to be removably positioned in the trailing vehicle. The housing is preferably in a rectilinear configuration. The housing has a front face 20 and a rear face 22. The rear face has a plurality of suction cups 24. The housing may be permanently secured as through a screw mounting 25 to a fixed surface of the trailing vehicle 26A or in the preferred embodiment, removably mounted onto a surface, such as a windshield 26 of the trailing vehicle. The housing also has a multiple, preferably three, axis accelerometer 28. The accelerometer is adapted to sense the status of the transmitter unit and the trailing vehicle. The housing also has electronic components. The electronic components are coupled with the accelerometer. The electronic components include: 1) primary elements 30 adapted to process sensed data using digital signal processing and to calculate and reorient position and acceleration vectors in free space before use, 2) a visual element 32 adapted to visually indicate the status of the transmitter unit and 3) transmission elements 34 adapted to transmit data regarding the status of the system.

The transmitter unit also includes associated supplemental sensors including a low voltage sensor 36 to determine a low voltage battery condition of the towed vehicle, a temperature detector 38 to determine the presence of low or elevated temperature on the towed vehicle and an undesired condition status monitor 40 to determine when an operational component in the towed vehicle is in an undesired condition. The operational component is selected from the class of operational components including door locks 42, TV antennas 44, windows 46, doors 48 and kitchen appliances 50, and in response to such undesired condition to transmit both prior to and subsequent to processing.

Provided last is a receiver unit 52. The receiver unit has a housing 53. It is adapted to be removably or fixedly positioned in the leading vehicle, either by the user with hook and loop fastening 54, retrofitting or by factory installation 55 to a permanent mounting surface 55A. The receiver is adapted to receive data transmitted from the transmission element. The housing also has 1) electronic detector components 58 adapted to process the received data in real time for detecting anomalies, 2) electronic setting components 60 adapted to adjust the sensitivity and threshold settings, 3) visual status indicators 62 adapted to visually indicate the status of the system, 4) frequency hopping components 64 adapted to enhance communications between the transmitter and receiver units and 5) an audio alarm 66 adapted to signal a user in audio proximity to the receiver unit in the event of any anomaly at the transmitter unit. The electronic detector components process the received data in real time. In this manner anomalies are detected. The electronic setting components adjust the sensitivity and threshold settings. The frequency hopping components enhance communications between the transmitter and receiver units. The audio alarm signals a user in audio proximity to the receiver unit in the event of any anomaly at the transmitter unit.

The present invention, in greater specificity includes the following features and components.

System Description

The system 10 comprises, Reference FIG. 1. of two modules, namely a transmitter 16 and a receiver 52. The transmitter is typically mounted in a towed vehicle 14 or trailer 14. The receiver is typically mounted in a recreational vehicle 12 or towing vehicle 12. The Transmitter and Receiver modules operate as a pair with unique identification protocols. This is done to prevent other Transmitter/Receiver pairs from cross communicating and providing contaminated data to the wrong pair.

Transmitter & Receiver Module Microcomputers

Both the transmitter module and the receiver module comprise of an identical microcomputer system. One possible embodiment of the microcomputer system is the Freescale Semiconductor MC13213 microcomputer/radio.

A microcomputer 30 and radio modem 34 with a microcomputer component, is integrated into one circuit component. The two microcomputers communicate via a serial peripheral interface.

Power to the modules is supplied from a 12V power source 31A. The power is routed through an EMI filter 31B to minimize EMI. The next stage is a DC-DC converter 31C that generates a 4V output. A linear regulator 31D then regulates the power to 3.3V.

Transmitter/Receiver Radio Modem Microcomputers

The radio modem 34 utilizes a commercial standard, one possible embodiment of which is a Zigbee Wireless Implementation. This implementation is designed for low data rates and low power. It is a subset of Bluetooth transmission technology. This utilizes the ISM band at 2.4 Ghz. The implementation utilizes spread spectrum technology, switching up to 15 different channels, to minimize interference from other 2.4 GHz sources.

The processing circuitry for the receiver circuit comprises an antenna 35A that receives a signal. This is then filtered by a network 35B to ensure a narrow band of frequencies in the 2.4 GHz range. This signal is routed through a transceiver switch 35C. When receiving a signal, additional gain i.e. transmission range can be obtained by using a Low Noise Amplifier 35D in the receiver circuit. This signal is routed through the balun network 35E and then processed by the radio microcomputer to decode any received data. This received data is then communicated to the microcomputer for processing. In the preferred embodiment, the transmitter unit and the receiver unit are wireless and the system further includes an amplifier in both the transmitter unit and the receiver unit.

When transmitting, the transmitter microcomputer communicates the data to the radio microcomputer and is then broadcast through the same radio circuit out to the antenna. The data is processed by the Radio modem 34 routed through the balun network 35E and then amplified by the power amp 35F. It is then routed through the transmit/receive switch 35C. This signal is then filtered 35B and broadcast out through the antenna 35A.

Main Transmitter/Receiver Microcomputers

The main microcomputers for the transmitter as well as the receiver 30 are identical commercially available, Freescale MC13213 components. They comprise of a Central Processing Unit (CPU), Flash (Program) memory, Random Access Memory (RAM), Input/Output (I/O) lines for interfacing with incoming or outgoing signals, two serial communication interfaces, Eight Analog to Digital conversion inputs, Software timers with inputs and outputs, and various other components to make the microcomputer functional.

Transmitter Module

Figure 6:
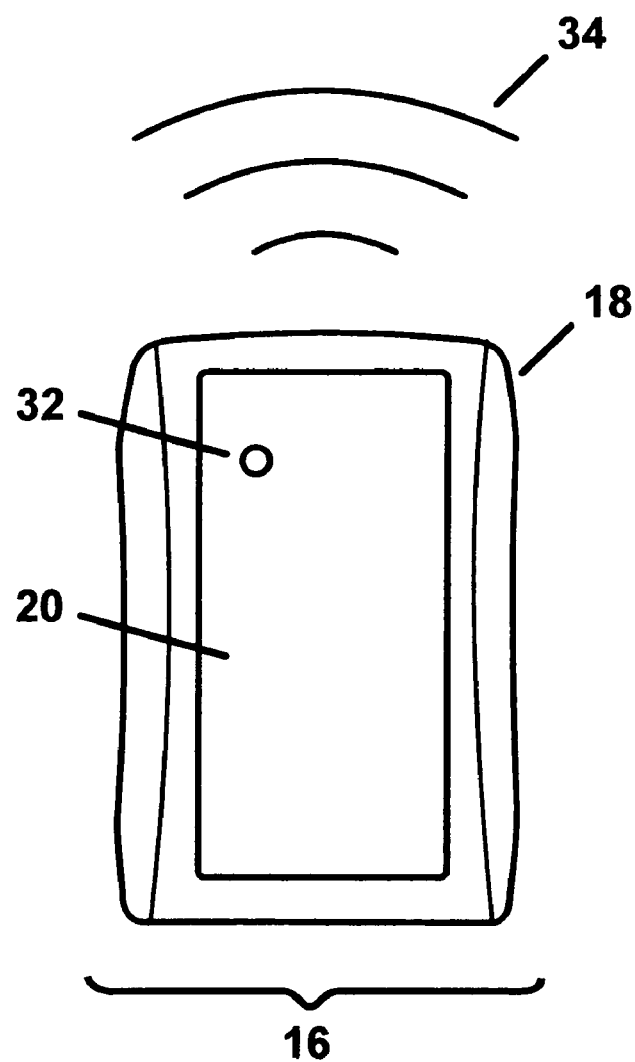
FIGS. 6 and 7 are front and rear perspective illustrations of the portable transmitter unit shown in FIG. 1.
Figure 7:
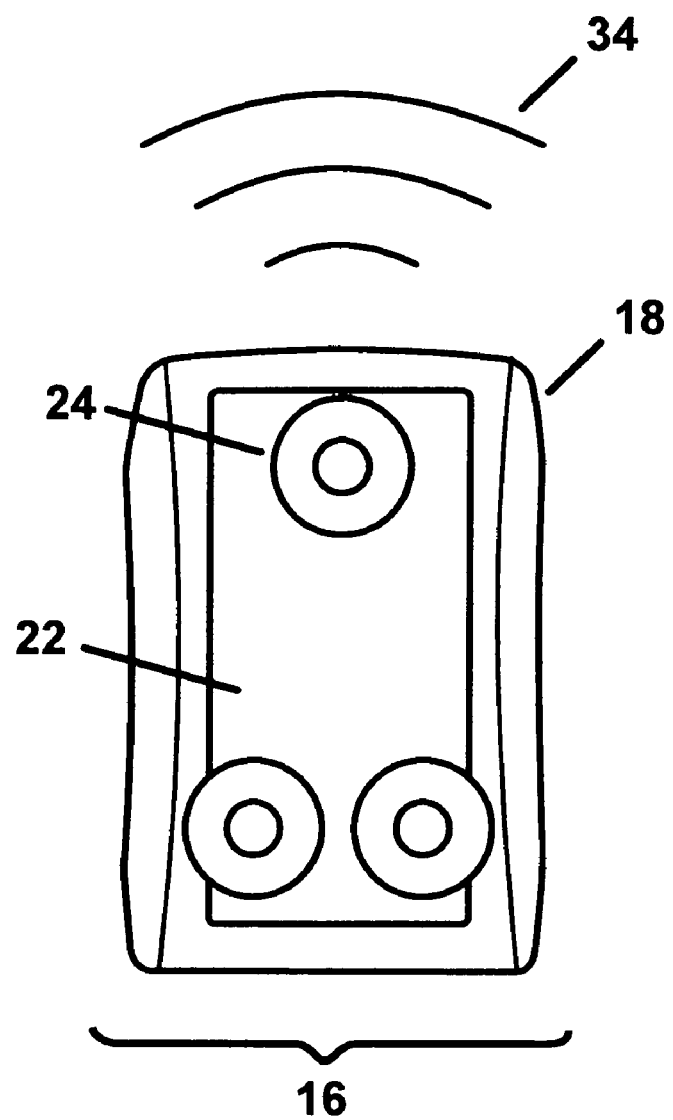
Figure 8:
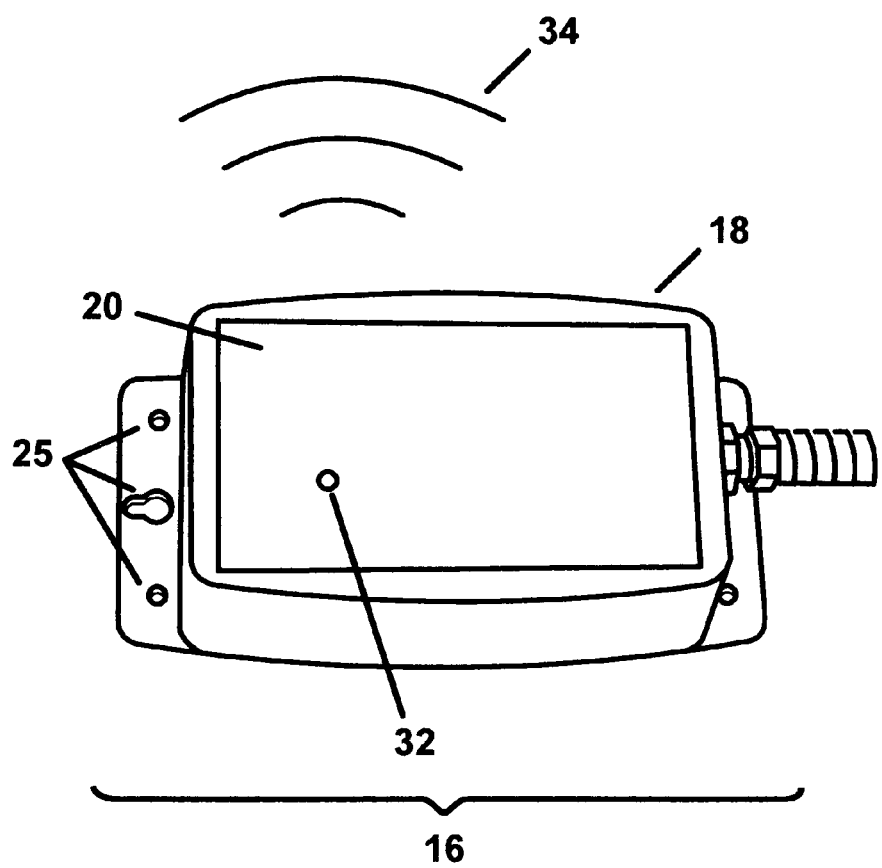
FIG. 8 is the front perspective illustration of a transmitter unit similar to FIGS. 6 and 7 but illustrating an alternate embodiment of the invention.

The transmitter module 16, Reference FIG. 6, comprises of a printed circuit board housing a microcomputer 30 and radio modem 34, a 3-axis accelerometer 28, such as a commercially available Freescale Semiconductor MMA7260, and various discrete components. Additionally, a tri-color LED 32 provides visual status information to the user.

Transmitter Microcomputer

The microcomputer 30 interfaces with an accelerometer 28 that measures acceleration in all 3 axis. The output of the 3-axis accelerometer is three analog voltages directly proportional to the measured acceleration axis. This acceleration is measured at a periodic rate. This analog signal is routed to the Analog/Digital converter on the microcomputer. This is then converted to a digital value and stored in memory for processing.

The dynamic range of the accelerometer is selectable using two digital lines 29 controlled by the microcomputer.

The microcomputer also interfaces with a temperature sensor 38 that provides an analog voltage directly proportional to the ambient temperature. This analog signal is routed to the Analog/digital converter on the microcomputer.

The microcomputer also controls a tricolor LED 32, via two digital outputs, to provide visual information to the user.

Additional sensors on the receiver and/or transmitter, one example of which is a low voltage sensor 36, provides data on measured power voltage. This information is processed by the microcomputer and can provide appropriate alarms and warnings.

Transmitter Module Software

The software utilizes an interrupt driven system heartbeat to synchronize all running processes. The Radio Modem and Main Transmitter Microcomputer (MTM) communicate in the background via a Serial Peripheral Interface (SPI). Any data that is to be transmitted or is received (via SPI) is buffered and then processed.

The software system comprises of multi thread routines as well as timer based interrupt routines.

Factory Calibration

Figure 9:
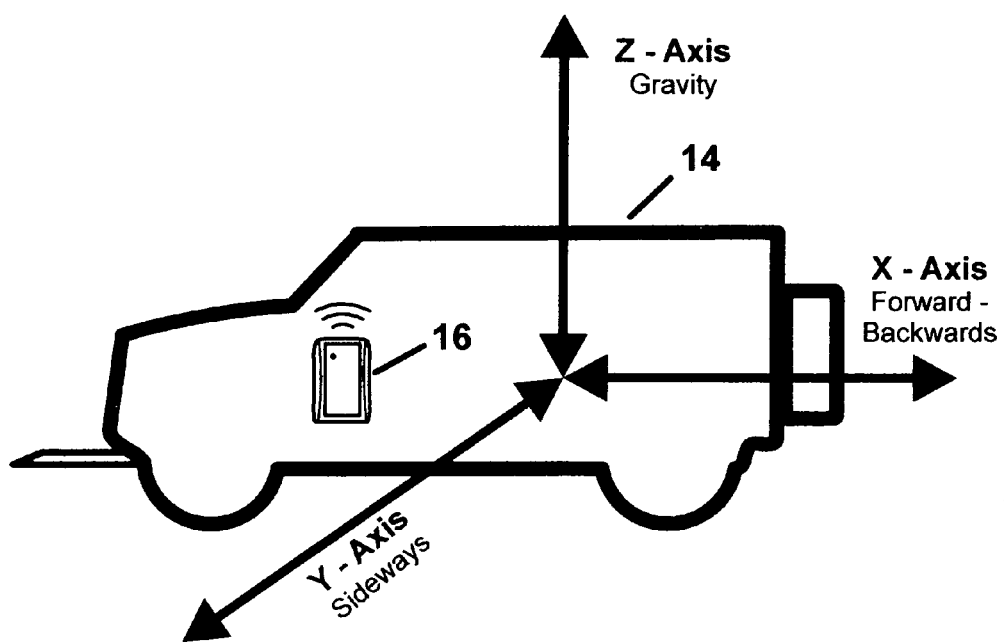
FIG. 9 is a side elevational view of a towed vehicle illustrating the three axes of forces being monitored.
Figure 10:
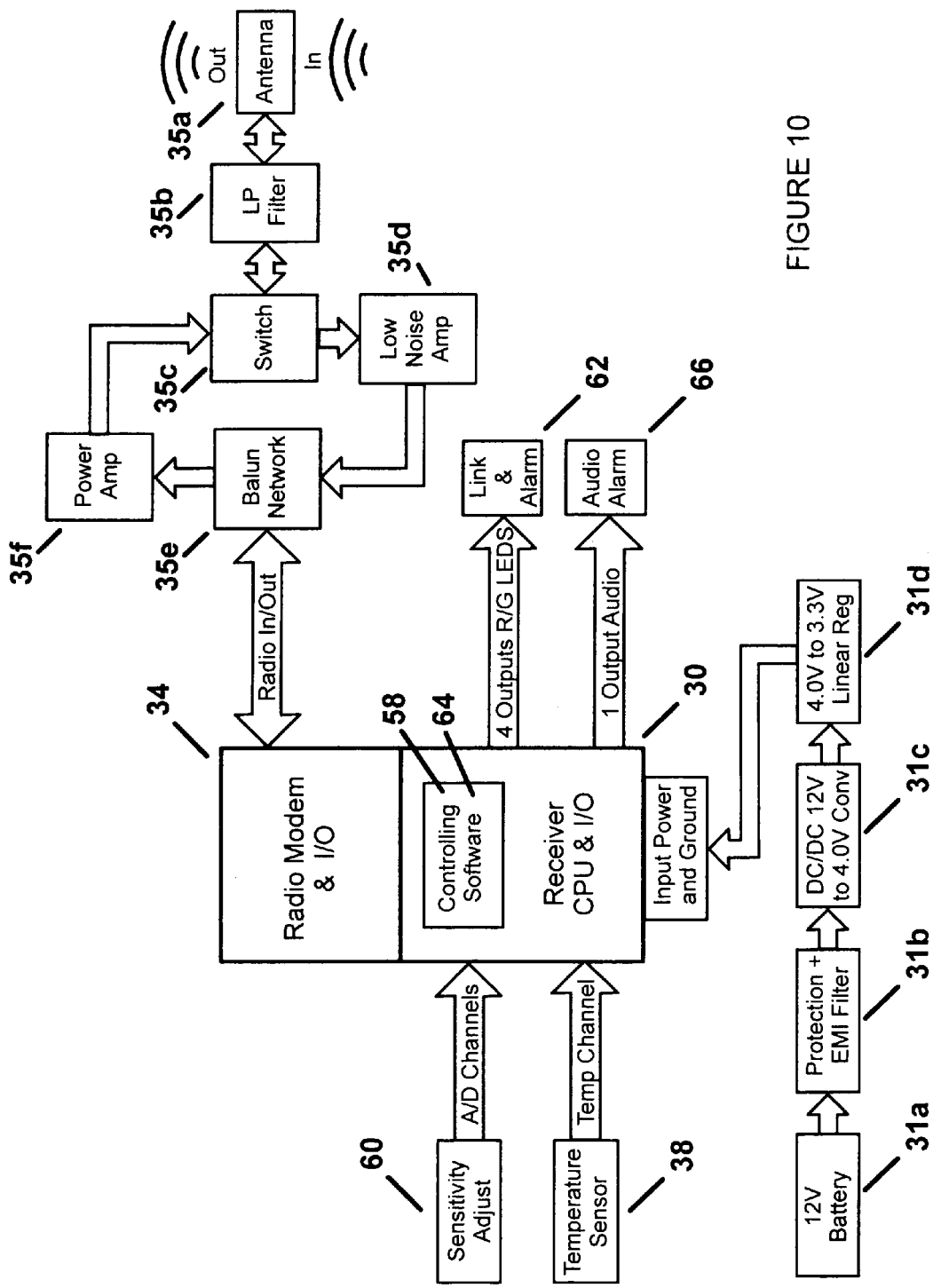
FIGS. 10-11 are various electrical diagram illustrations of the various components of the system.
Figure 11:
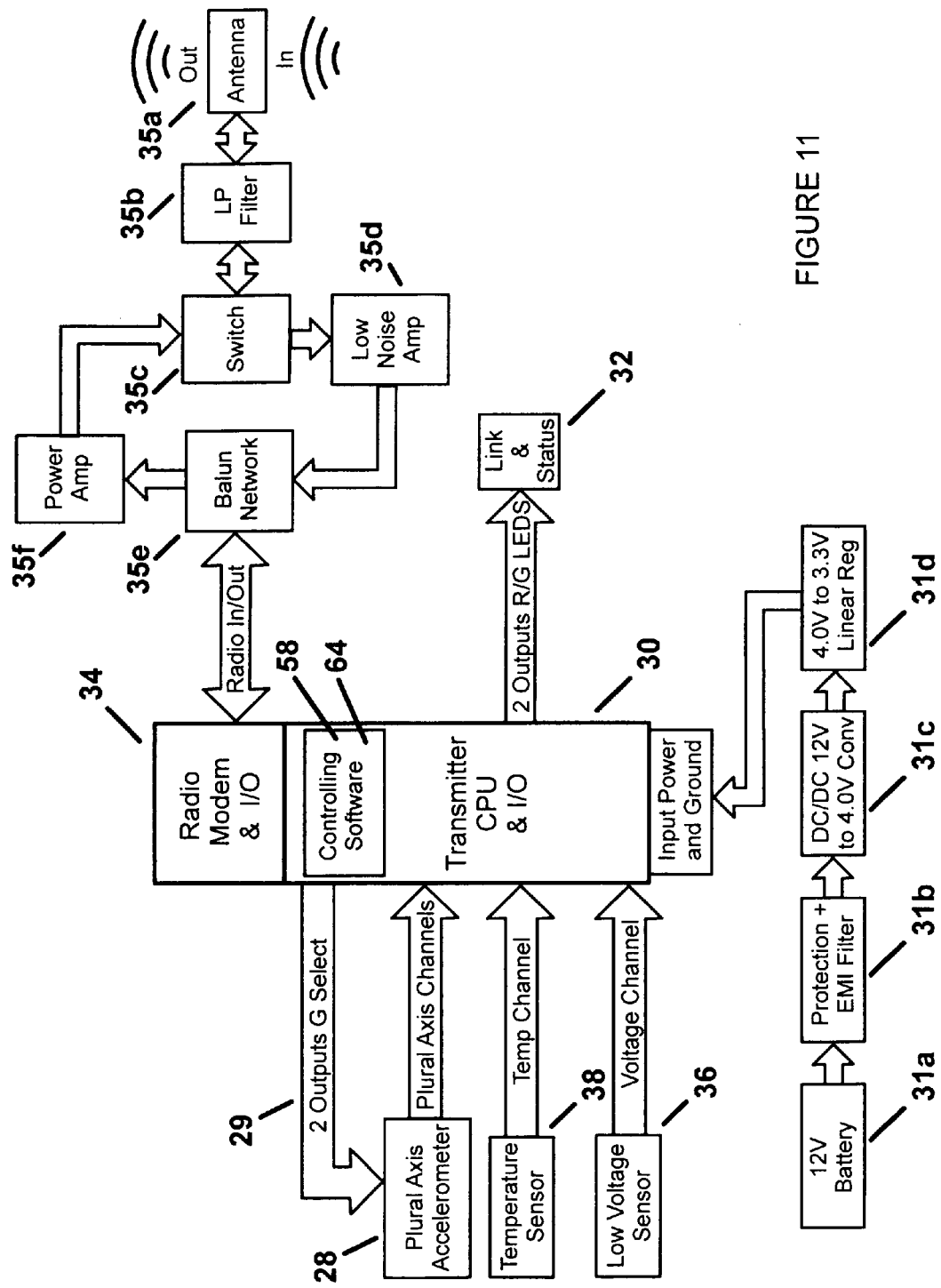
Figure 12:
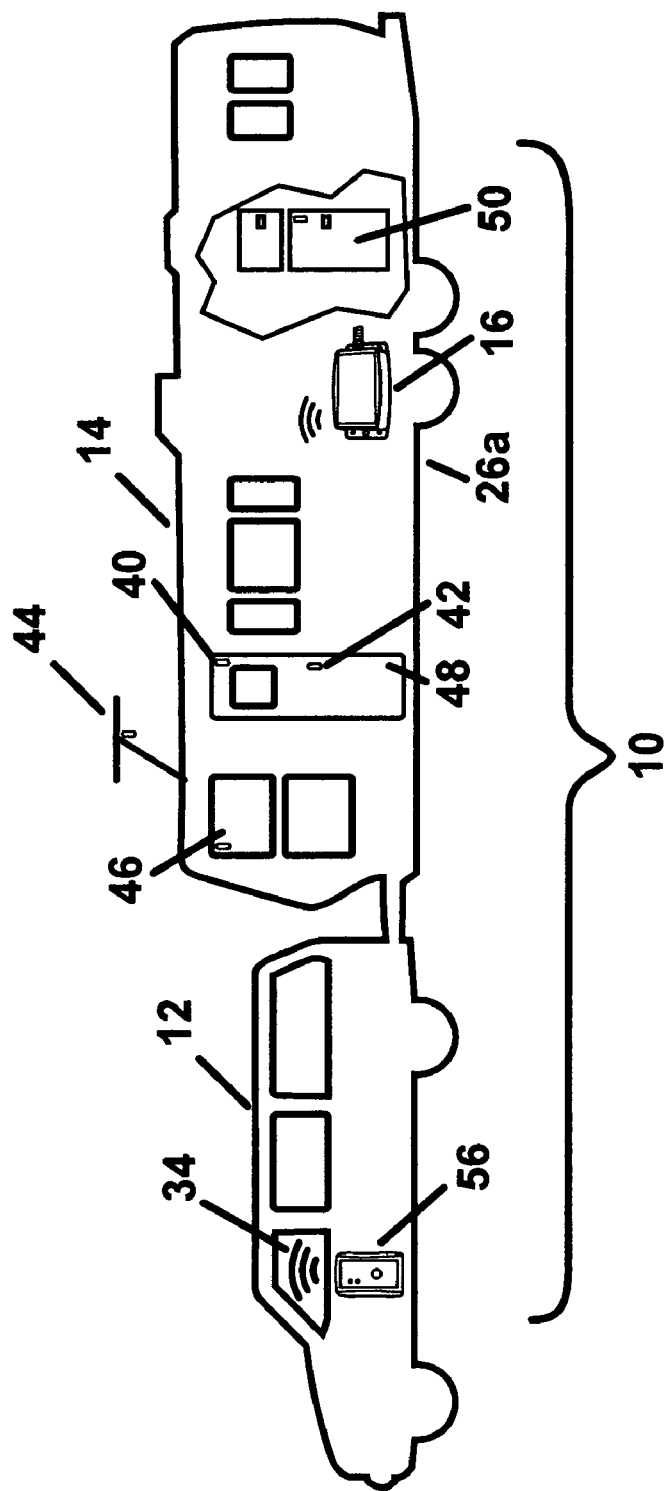
FIGS. 12 and 13 are side elevational views of a towing monitor system with a transmitter, either portably or permanently attached, utilizing undesired condition status monitoring of the unmanned, unpowered trailing vehicle.
Figure 13:
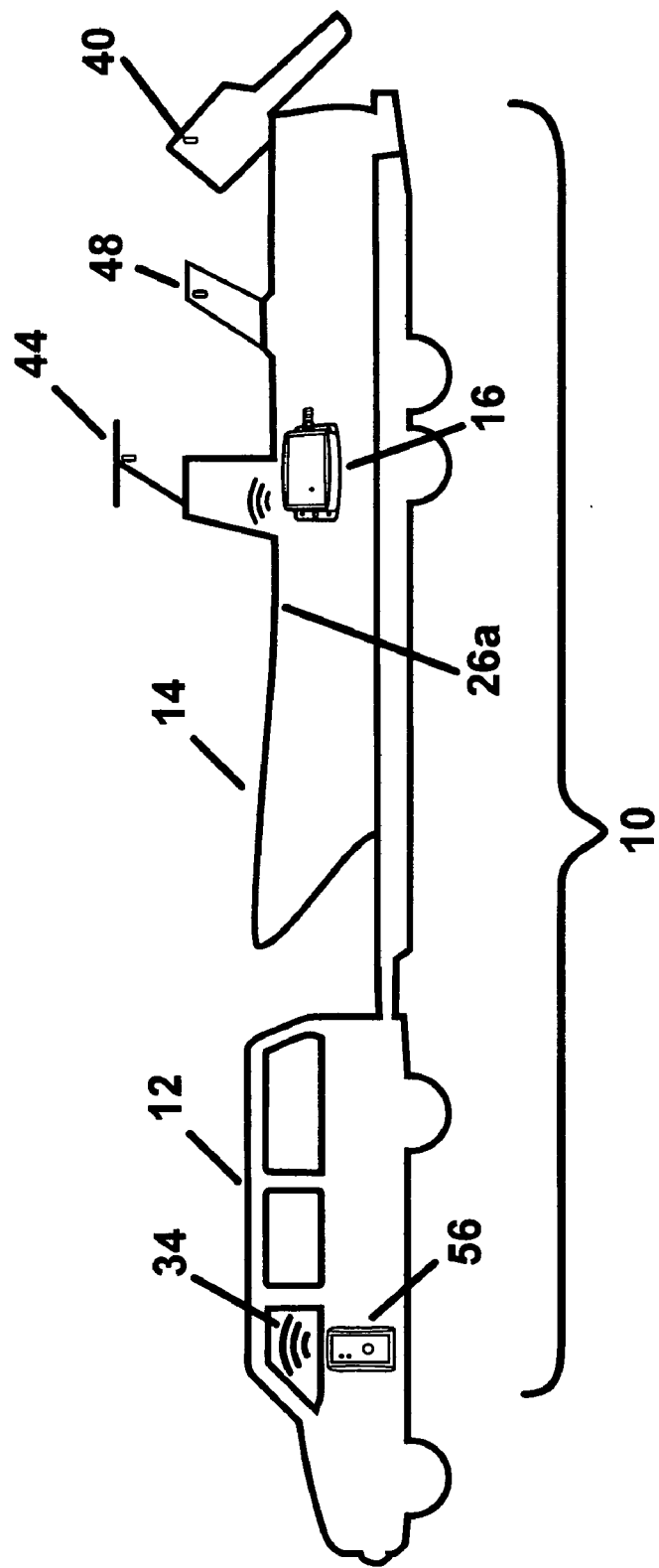

Reference FIG. 9. The 3-axis accelerometer is aligned with the directions as shown. The z-axis is the gravity vector. The x-axis is the forward and backward direction vehicle movement. The y-axis is the sideways movement of the towed vehicle.

The transmitter accelerometer undergoes a calibration process at the factory. The transmitter is placed in a horizontal position and the calibration routine is initiated. The gravity vector, which should be 1 g, as measured by the accelerometer, is stored in the flash memory. The remaining two axis values read are also stored so as to establish a zero-point on those two axes. The device is then turned 90 degrees to measure another axis relative to the gravity vector. This establishes the zero-point for the z-axis. The values are stored in flash memory. These are the baseline accelerometer Calibration and ideal Orientation values for the 3 axes.

The module is programmed to be a transmitter and also includes serial number data.

System Pair ID

Every time any data is transmitted or received, the system checks the availability of a specific receiver. The transmitter and receiver modules are paired together by a unique identification system. This is done to ensure there are no communication collisions or cross communication with other receivers or transmitters that may be within range. This identification code is programmed into the system at the factory during calibration.

Normal Operation

At power up the system initializes all the setup registers and peripherals, performs a self check, and starts the main program loop.

Attitude Adjustment

The system then checks the integrity of the Accelerometer calibration data. This accelerometer calibration has been completed at the factory. The software then takes multiple 3 axis readings. These values are processed through a Low Pass Digital filter. This is to ensure that the transmitter/system is stationary or level or stable. These values are compared relative to the stored calibration values. Using the Gravity vector, which is a known direction, the software uses this data to check the physical device orientation. If the values are within a minimum threshold, degrees, no attitude adjustment is required.

If the relative thresholds are greater than the minimum threshold, degrees, then an algorithm for adjustment is applied.

The measured values are compared to a normalized z-axis vector (g) and using Quaternion mathematics, an operator is established that will map it into a co-ordinate system with the corresponding axis. This operator will be applied to all 3 axes, namely the forward (x-axis), sideways (y-axis) and up/down (z-axis), on every sample after attitude adjustment is complete. These axis vectors are then rescaled to the known orientation. This orientation operator is stored in non volatile memory. This completes the attitude adjustment phase. This adjustment is recalculated every time power is applied to the Transmitter System.

Normal Transmission

The system then takes 3-axis acceleration readings, at a rate of 100 samples/sec. These values are then re-scaled applying the measured/calculated/saved factors and then are transmitted to the Receiver module for processing. This data is now measured/scaled and transmitted periodically, in real time. This is the normal state of the transmitter module.

Sleep Mode

The Transmitter Microcomputer also monitors data transmissions from the receiver module. If the receiver module is not on or transmitting, the Transmitter Module goes to a Sleep Mode. This is performed to conserve power. The transmitter module will then wake up after a predefined time, to check if the receiver has been powered up and can perform accelerometer temperature compensation for orientation. If there is a receiver operating, it will resume operation. If not, it will go back to Sleep Mode.

Receiver Module

The receiver module comprises of a printed circuit board housing a microcomputer 30 and radio modem 34.

A user controlled potentiometer 60 to set sensitivity/threshold generates an analog voltage depending on a setting selected by the user. This analog signal is routed to the Analog/Digital converter on the microcomputer and converted to a digital value threshold and stored in memory for processing.

The microcomputer also controls two tricolor LED's 62 via four digital outputs, to provide visual information to the user, namely Link and Alarm.

The microcomputer also controls a digital output to turn on a buzzer for audio alarms. This digital output is a software controlled variable, pulse width modulated timer output. A 50% duty cycle enables a buzzer with full volume and a 10% duty cycle outputs a lower volume alarm. Any duty cycle between 10% and 50% provides a corresponding audio volume level. Additional discrete components are also used for interfacing.

Receiver Module Software

The software utilizes an interrupt driven system heartbeat to synchronize all running processes. The Radio Modem and the Receiver Main Microcomputer communicate in the background via a Serial Peripheral Interface (SPI). Any data that is to be transmitted or is received (via SPI) is buffered and then processed.

The software system comprises of multi thread routines as well as timer based interrupt routines.

Factory Calibration

The module is programmed at the factory to be a receiver and also includes serial number data.

System Pair ID

Every time any data is transmitted or received, the system checks the availability of a specific receiver. The transmitter and receiver modules are paired together by a unique identification system. This is done to ensure there are no communication collisions or cross communication with other receivers or transmitters that may be within range.

This identification code is programmed into the system at the factory during calibration.

Normal Operation

At power up the system initializes all the setup registers and peripherals, performs a self check, and starts the main program loop.

Normal Transmission

The communication link to the Transmitter module is monitored. If the modules are communicating, then the system receives data from the 3-axis accelerometer transmitter, at a rate of 100 samples/sec. This data is now received periodically, in real time. Numerous digital filter algorithms are applied to this data. The output of these algorithms is compared to a user set threshold and generates visual and audible alarms, depending on the conditions. This is the normal state of the transmitter module.

Digital Filter Algorithms

The Receiver Microcomputer processes the 3-axis accelerometer data in real time. The first digital algorithm is a high pass filter to remove slower moving values such as slow turns and attitude changes while moving.

The next digital algorithm is a digital rectifier that rectifies negative accelerations, relative to a center baseline.

The rectified signal is then processed through a low pass digital filter in order to form a cumulative measure of any rapid changes in acceleration.

Alarms and Communication

The output of this low pass filter is then compared to the threshold set by the user.

If the output is higher than the set threshold, and only lasts for fractions of a second, (such as a bump) then the Alarm LED and audio buzzer are enabled momentarily. This results in a flash and a beep.

If the output is higher than the set threshold and lasts longer than a preset time, the alarm LED's and Buzzer go into an escalating alarm mode to indicate a problem, such as, but not limited to, a blown tire, bad bearings, loose or disconnected hitch, etc. These algorithms and thresholds are applied to all three axes.

A bump is indicated at a lower audio alarm volume. An escalated alarm is indicated by an increasing audio volume and frequency, if it persists, as well as an escalating faster flashing LED.

The receiver module also measures the quality of the signal received from the transmitter module. In order to provide reliable and failsafe operation, the communication quality is assessed in real time.

One embodiment of a failsafe algorithm, in case of communication loss is as follows:

If the communication is lost for more than a fixed period of time, a link alarm is enabled to warn the user that communication with the transmitter module has been lost.

If the communication returns before the fixed timeout period, operation continues as normal.

If the communication is intermittent, and keeps coming back, within the fixed communication timeout period, and was in escalation mode when it lost communication, the receiver module continues to escalate the alarm, thus making the system warning fail safe.

Another embodiment of a failsafe algorithm, in case of communication loss is as follows:

Acceleration values are stored in transmitter system memory, one embodiment of which is a circular buffer. The acceleration values for the last few seconds are stored, at the transmitter, and) and overwritten when normal communications and a good quality link signal is available. If communication is lost, especially intermittently, the transmitter system then continues to store accelerometer values, without clearing the buffer. If the communication link is established before-a pre designated time, these values are transmitted, in a burst mode, to the receiver to be processed as normal. Thus no information is lost, even with an intermittent connection.

Using Frequency Hopping in a Wireless Towing Monitor Application Issue:

In the wireless data communication application such as a towing monitor, as described previously, one of the most difficult criteria to define is the operational range of the system.

It is easier to predict outdoors, due to the relatively larger amount of multipath reflections observed in indoor environments. If transmission range is insufficient, the towing monitor may simply not work reliably, lose data or may require repeaters, cabling or additional access points. Effective range is influenced by physical obstructions (walls and other structures or furniture) and electrical interference (other wireless devices or electrical noise) present in the environment.

In the towing monitor application, all three of these disadvantages are present, namely walls, structure or furniture in an RV or Motor Home (or trailer and its contents), Electrical interference from cell towers located outdoors while traveling or in the city, and WLAN's (Wireless Local Area Networks) that may be present while traveling through different locations and a constant changing line of sight outdoors.

The range issue can be resolved by increasing the power output of the transmitter and increasing the sensitivity of the receiver. However, in the US, there is a regulatory limitation of the maximum transmitting power using a fixed transmission frequency. (As mentioned before, the Towing Monitor System uses the ISM band at 2.4 GHz. although not limited to this band eg the 902-928 MHz band)

Solution:

In order to make this unique application function reliably, a common technique called frequency hopping (or Spread Spectrum Frequency Hopping) is employed. In the U.S. if frequency hopping is utilized, an output power of up to 125 mW is allowed under the FCC regulations section 15.247.

The main requirements are that at least 15 frequencies in the 2.4 GHz-2.48 GHz. band are used, that on average each channel is used equally and on average that each channel is used less than 0.4 seconds every 20 second period. Thus, the large output power allows a wide radio range. Other allowed bands (regulatory) with a larger number of frequencies (channels) can also be used.

Advantages

The most important advantage is that the limitation due to the pseudo indoor environment of an RV or trailer, the constant changing outdoor environment and the existence of other RF networks is overcome by the higher output power of the transmitter/receiver monitor system.

Since spread-spectrum technology has its roots in military applications, much of the terminology refers to enemy "jammers" of varying complexity. In commercial systems, intelligent jamming is not a primary threat. Most of the time, the "jamming" signal will merely be another device trying to utilize the same frequency band for communicating. These devices will typically not be as devious as intelligent enemy jammers might be, so the security requirements can be eased a bit compared to military applications. The so-called "narrow-band jammer" is probably the most representative threat seen in civilian applications. Interference from multi-path reflections is also a serious threat. These reflections can cause large frequency and location dependent drops in signal strength. Frequency hopping combats multi-path reflections by ensuring frequency diversity.

Other important advantages are reliability and data security. If some of the channels are jammed because of noise, jamming or multi-path reflections, the system will still be able to operate on the other frequencies. Furthermore, eavesdropping is more difficult since similar competitive equipment will have to find the frequency hopping sequence and change channels fast.

Description:

The Tattle-Trail Towing Monitor System uses one such embodiment of a frequency hopping technique. There are numerous methods of implementing frequency hopping. The following describes one such method.

Frequency hopping, as implied by the name, is performed by changing carrier frequencies while communicating. In a typical system, the frequency hopping will be of the so-called slow variety, which means that several data bytes are transmitted during each hop. A rate between 10 and several hundred hops per second is practical.

Time Slot Terminology

The time during a hop when data cannot be received or transmitted is termed the blanking interval. The dwell time is the time spent in each channel. The data is transmitted or received at different times.

Time and Frequency Synchronization

Perhaps the single most challenging design issue when implementing a frequency-hopping system is how to synchronize the transmitter and receiver. This can be done in many ways. Industry literature often mentions sophisticated correlation techniques, impractical in small systems using microcontrollers such as in the Towing Monitor System.

In the Towing Monitor System, the receiver and transmitter are provided with a table of channels or pseudo-random channel number generator that represent the allowable frequencies for frequency hopping. The number of channels will depend on the application. For 125 mW operation in the 2.4 GHz.-2.48 GHz. band the minimum number of channels required by the FCC is 15.

First the receiver must 'acquire' the transmitter, and then it must be able to track it. A common synchronized clock is used and requires a very stable crystal oscillator for both transmitter and receiver. This is called the acquisition phase.

Acquisition Phase

At power up, the Master Receiver sends out a synchronization time and rotates through all the allowed channels to 'find' the transmitter. Statistically, the transmitter and receiver will 'cross' paths on the same channel after they have been synchronized. One method to facilitate the synchronization is that the receiver hops at a much slower rate than the transmitter. The receiver hop dwell times will typically be the transmitter dwell time multiplied by the number of channels. The receiver listens to each channel, trying to find data transmitted by the transmitter. When valid data is received, the system is now in 'sync' and will have synchronized time slots. The receiver and transmitter are synchronized in time, and the receiver can start hopping in synchronization with the transmitter.

Tracking Phase

In the tracking phase, the receiver must stay in synchronization with the transmitter. To keep the complexity down, some constraints are added. Having a fixed time interval between hops simplifies timing considerably. The frequency hopping system uses a fixed hop rate. Both the receiver and transmitter can then count bits to know when to jump.

The next step is to decide how the transmitter and receiver will hop from channel to channel. To maximize the benefits of frequency hopping, the hopping is performed pseudo-randomly. The transmitter and receiver use a pseudo-random number generator with the same seed number, or the transmitter might transmit the next channels as part of the data packet.

Beacons and Communication

The master periodically transmits a beacon, each time at a new frequency. The master steps through a pseudo-random sequence of any number of frequencies. The slave's know the sequence and switch in advance to that frequency. The beacon is a byte that is unique for each system so that the slaves do not tune in to the wrong master.

Each Master and Slave have a time slot that is designated as a listen or receive for either Transmitter/Receiver, a transmit time slot for either Transmitter/Receiver, a time slot designated as the blanking interval and a time slot designated as the dwell time, time spent in either transmit or receive.

The transmitter sends out data at a predetermined frequency, in a predetermined time slot. The receiver receives the data in a predetermined time slot and transmits back in a predetermined frequency and time slot.

Protocol

The Towing Monitor has a Master (Receiver) and a Transmitter (Slave). The protocol is packet based and allows one-to-one and one-to-many communication between a master and any number of slaves. Communication between the slaves can be indirectly supported through the master. All nodes or systems carry an ID. Thus one system will not interfere with data from another.

Conclusion:

The spread spectrum frequency hopping technique is used in the unique towing monitor application to improve range, data integrity as well as reliability.

Tattle-Trail, Key Aspects

1. Transmitter and receiver communicate wirelessly. (RF)
2. Monitors movement of the whole trailed vehicle in all three axis. (not just the axle hub vertically)
3. Auto calibration (orientation) of transmitter.
4. Notifies operator if transmitter falls from attached surface. (orientation not correct)
5. Both portable and fixed mounted models.
6. Adjustable vibration alarm threshold. (could be automatically set or operator set)
7. Audible and visual alarms escalate when alarm persists. (controlled action intervention could accompany alarm conditions)
8. Special algorithms to weed out false alarms.
9. Transmitter is configured with a "sleep mode" to save power in the towed vehicle when the receiver is turned "off".
10. Monitors for movement (shock, tilt & vibration) in the "Park" mode.
11. Monitors communication from the transmitter to the receiver and vise versa to assure accurate performance.
12. Also, monitors the communication link to assure the target unit is still within range of the transmitter. (monitors for towed vehicle disconnect or theft)
13. Monitors battery supply voltage in the target unit and alarms at a predefined threshold.
14. Can monitor additional functions in the target unit (car, trailer, boat, etc.) such as: temperature, window/door or hatch open, angle change, antenna up, movable step deployed, etc.
15. Can be integrated into other systems. i.e. (built into a portable or fixed auxiliary braking system for example or built into the dash of a motor home)
16. Has unique ID for each system to prevent interference between systems.
17. Monitoring can be detected in both the transmitter and receiver locations and this information used to null out common movement and identify movement that is only occurring in the trailed vehicle.
18. Alarm conditions can be displayed on the transmitter, receiver or both as well as being indicated at another remote location. i.e. (cell phone or key fob notification.)

The transmitter 16 is adapted to sense a fall from its calibrated position and to transmit a signal in response thereto for illuminating lights 62 and audible indicator 12 on the receiver.

The transmitter 16 includes a power saving configuration operable when the receiver 52 is turned off to reduce power consumption in the transmitter.

The transmitter 16 is adapted to monitor for adverse movement when in a stationary position and to generate an out of norm indication at the receiver 52.

The transmitter 16 and receiver 52 communicate reciprocally to insure accuracy of data and verify that the units are within communication range.

The receiver 16 located in the lead vehicle also has an accelerometer to measure at least one axis and to compare the information it takes from what it receives from the transmitter in the trailing vehicle to null out the road conditions and then looks for additional movement at the receiver 16 to indicate problems.

A supplemental device is adapted to receive notification in response to the sensed signal from the transmitter or receiver.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A monitor system comprising:
 a transmitter unit having a housing adapted to be coupled in association with a trailing vehicle, the housing also having an accelerometer means to monitor three axes, a first axis for monitoring up and down movement, a second axis for monitoring side-to-side sway movement, and a third axis for monitoring forward and rearward movement, the housing also adapted to sense the transmitter unit and a trailing vehicle, the housing also having electronic components coupled with the accelerometer, in the transmitter unit;

primary elements adapted to calculate and reorient position and acceleration vectors in free space before use; and a receiver unit having a housing adapted to be coupled in association with a leading vehicle to communicate with a user in proximity to the receiver unit of any anomaly at the transmitter unit.

2. The system as set forth in claim 1 and further including in the transmitter unit:
a visual element adapted to visually indicate the status of the transmitter unit.

3. The system as set forth in claim 1 and further including in the transmitter unit:
transmission elements adapted to transmit data regarding the system.

4. The system as set forth in claim 1 and further including in the receiver unit:
electronic detector components to process the received data in real time for detecting anomalies.

5. The system as set forth in claim 1 and further including in the receiver unit:
electronic setting components for adjusting the threshold settings.

6. The system as set forth in claim 1 and further including in the receiver unit:
a visual status/indicator.

7. The system as set forth in claim 1 and further including in the receiver unit:
frequency hopping components to enhance communications between the transmitter and receiver units.

8. The system as set forth in claim 1 and further including in the receiver unit:
an audio alarm to signal a user in audio proximity to the receiver unit in the event of any anomaly at the transmitter unit.

9. The system as set forth in claim 1 wherein the housing for the transmitter unit includes suction cups for coupling to a surface of a towed vehicle.

10. The system as set forth in claim 1 wherein the housing for the transmitter unit is waterproof and includes a means to facilitate coupling to the trailing vehicle.

11. The system as set forth in claim 1 wherein the transmitter'unit and the receiver unit are in communication and further including an amplifier in both the transmitter unit and the receiver unit.

12. The system as set forth in claim 1 wherein the transmitter is adapted to sense a change from its calibrated position and to transmit a signal in response thereto for illuminating lights and audible indicator on the receiver.

13. The system as set forth in claim 1 wherein the transmitter includes a power saving configuration operable when the receiver is turned off to reduce power consumption in the transmitter.

14. The system as set forth in claim 1 wherein the transmitter is adapted to monitor for adverse movement when in a stationary position and to generate an out of norm indication at the receiver.

15. The system as set forth in claim 1 wherein the transmitter and receiver communicate reciprocally to insure accuracy of data and verify that the units are within communication range.

16. The system as set forth in claim 1 wherein a supplemental device is adapted to receive notification in response to a sensed signal from the transmitter.

17. The system as set forth in claim 16 wherein the supplemental device is chosen from the class of supplemental devices including a cell phone, an auxiliary braking system, brake controllers and a graphic display.

18. The system as set forth in claim 1 wherein a supplemental device is adapted to receive notification in response to the sensed signal from the receiver.

19. A monitor system comprising:
a transmitter unit having a housing adapted to be coupled in association with a trailing vehicle, the housing also having a three axis accelerometer, the monitoring being with respect to a first axis for monitoring up and down movement, a second axis for monitoring side-to-side sway movement, and a third axis for monitoring forward and rearward movement, the housing also adapted to sense the transmitter unit and a trailing vehicle, the housing also having electronic components coupled with the accelerometer; and a receiver unit having a housing adapted to be coupled in association with a leading vehicle to wirelessly signal a user in audio proximity to the receiver unit of any anomaly at the transmitter unit;

wherein the receiver also has an accelerometer to measure at least one axis and to compare information it takes from what it receives from the transmitter in a trailing vehicle to null out the road conditions and then looks for additional movement at the transmitter to indicate problems.

20. A towing monitor system for wirelessly determining a status of a trailing vehicle, when in motion and when not in motion, from a leading vehicle and from other locations in a safe, reliable, convenient and economical manner comprising, in combination:

a manned self-powered leading vehicle chosen from a class of self-powered leading vehicles including automobiles, recreational vehicles and trucks;

an unmanned unpowered trailing vehicle chosen from a class of unpowered trailing vehicles including towed boats, automobiles, recreational vehicles, trucks, trailers and the like;

a transmitter unit having a housing adapted to be positioned in the trailing vehicle, the housing being in a configuration with a front face and a rear face, the rear face having means for mounting onto a surface of the trailing vehicle, the housing also having a three axis accelerometer adapted to sense a status of the transmitter unit and the trailing vehicle, the three axis accelerometer adapted to monitor with respect to a first axis for monitoring up and down movement, a second axis for monitoring side-to-side sway movement, and a third axis for monitoring forward and rearward movement, the housing also having electronic components coupled with the accelerometer, the electronic components including 1) primary elements adapted to process sensed data using digital signal processing and to calculate and reorient position and acceleration vectors in free spice before use, 2) a visual element adapted to visually indicate a status of the transmitter unit and 3) transmission elements adapted to transmit data regarding the status of the system, the transmitter unit also including associated supplemental sensors including a low voltage sensor to determine a low voltage battery condition of a towed vehicle, a temperature detector to determine the presence of low or elevated temperature on the towed vehicle and an undesired condition status monitor to determine when an operational component in the towed vehicle is in an undesired condition, and in response to such undesired condition to transmit both prior to and subsequent to processing; and a receiver unit having a housing adapted to be positioned in the leading vehicle as by a fastener, the housing also having a receiver adapted to receive data transmitted from the transmission element, the housing also having 1) electronic detector components adapted to process the received data in real time for detecting anomalies, 2) electronic setting components adapted to adjust threshold settings, 3) a visual status indicator adapted to visually indicate the status of the system, 4) the transmission technique being chosen from a class of transmission techniques including single channel, spread spectrum and frequency hopping with components adapted to enhance communications between the transmitter and receiver units and 5) an audio alarm adapted to signal a user in audio proximity to the receiver unit in the event of any anomaly at the transmitter unit.

* * * * *